(12) United States Patent
Burkhardt et al.

(10) Patent No.: US 6,839,943 B2
(45) Date of Patent: Jan. 11, 2005

(54) FASTENING DEVICE ON A PLASTIC ATTACHMENT FOR MOTOR VEHICLES

(75) Inventors: Steffen Burkhardt, Herrenberg (DE); Dietmar Preissler, Hagenbuch (DE); Anton Sautner, Treuchtlingen (DE)

(73) Assignee: Dynamit Nobel Kunststoff GmbH, Weissenburg (DE)

( * ) Notice: Subject to any disclaimer, the term of this patent is extended or adjusted under 35 U.S.C. 154(b) by 0 days.

(21) Appl. No.: 10/374,701

(22) Filed: Feb. 26, 2003

(65) Prior Publication Data

US 2004/0098844 A1 May 27, 2004

(30) Foreign Application Priority Data

Mar. 8, 2002 (DE) ......................................... 102 10 129

(51) Int. Cl.⁷ ............................................. B60R 21/00
(52) U.S. Cl. ............................. 24/458; 24/291; 24/292; 24/289; 24/297; 24/457; 280/495; 293/117; 411/55
(58) Field of Search .......................... 24/458, 457, 455, 24/297, 291, 292, 289; 280/505, 495, 500; 293/117

(56) References Cited

U.S. PATENT DOCUMENTS

| | | | | |
|---|---|---|---|---|
| 4,620,736 A | * | 11/1986 | Shanks ....................... | 280/500 |
| 4,875,728 A | * | 10/1989 | Copp et al. ................. | 293/126 |
| 5,269,640 A | * | 12/1993 | Jonishi et al. .............. | 411/55 |
| 5,411,310 A | * | 5/1995 | Viertel et al. ............... | 24/458 |
| 6,113,164 A | * | 9/2000 | Setina ......................... | 293/142 |
| 6,340,187 B1 | * | 1/2002 | Villiere et al. .............. | 293/117 |
| 6,364,589 B1 | * | 4/2002 | Wenglinski ................. | 24/297 |

FOREIGN PATENT DOCUMENTS

DE 19819698 A1 * 11/1999 ............ B60R/19/48

\* cited by examiner

Primary Examiner—Victor Sakran
(74) Attorney, Agent, or Firm—Fulbright & Jaworski L.L.P.

(57) ABSTRACT

A fastening device on a plastic attachment for a motor vehicle, especially on a bumper, with a receptacle formed in one piece on the attachment for a part to be fastened to the attachment by means of snap fastening, which, like the receptacle, has no resiliently deformable snap fastening element, and a plug-in element having resiliently deformable snap fastening elements for position-setting snap fastening on the one hand to the part to be fastened and on the other hand to the socket on the attachment, is to be made susceptible of rational and simple manufacture. For this purpose such a fastening device provides for the engagement of at least one of the snap fastening means of the plug-in element, the receiver of the attachment has substantially oppositely lying arms of limited circumference with at least one opening each with respect to the direction of insertion of the plug-in element for the achievement of the position-fixing snap fastening in question. The plug-in element is provided with pockets for the engagement of the arms of the receiver of the attachment, in which the arms, with their freely terminating end portions, are fixed in position on all sides in a plane perpendicular to the direction of insertion of the plug-in element.

2 Claims, 2 Drawing Sheets

FASTENING DEVICE ON A PLASTIC ATTACHMENT FOR MOTOR VEHICLES

FIELD OF THE INVENTION

The invention relates to a fastening device on a plastic attachment for motor vehicles.

BACKGROUND AND SUMMARY OF THE INVENTION

Such a device is disclosed in DE 198 19 698 A1.

Therein the socket formed on the attachment to which the plug-in element is joined by a snap fastening is in the form of a circumferential collar. If such a collar lies in an adjacent surface of the attachment running concavely over the circumference of this ring, a plastic component of this kind is extremely difficult to manufacture, since the molds required for making it cannot be stripped out reasonably unless they are subjected to a complicated division.

To create a remedy, the problem with which the present invention is concerned is solved by a configuration of the generic device according to the present invention.

The solution according to the invention is based on the general idea of reducing the circumferentially continuous ring in the known device for holding the attachment to arms situated circumferentially opposite one another and connecting them by fastening means to the plug-in element such that, despite the individual arms of the receiver which are less stiff than a collar, an all-around stable connection capable of stress is assured. The circumferential spaces between the arms permit a simple stripping out of the manufacturing molds.

An appropriate embodiment of the invention is the subject of the sub-claims.

An especially advantageous embodiment is represented in the drawing.

Preferred embodiments are shown in the figures.

DETAILED DESCRIPTION

Figure 1:
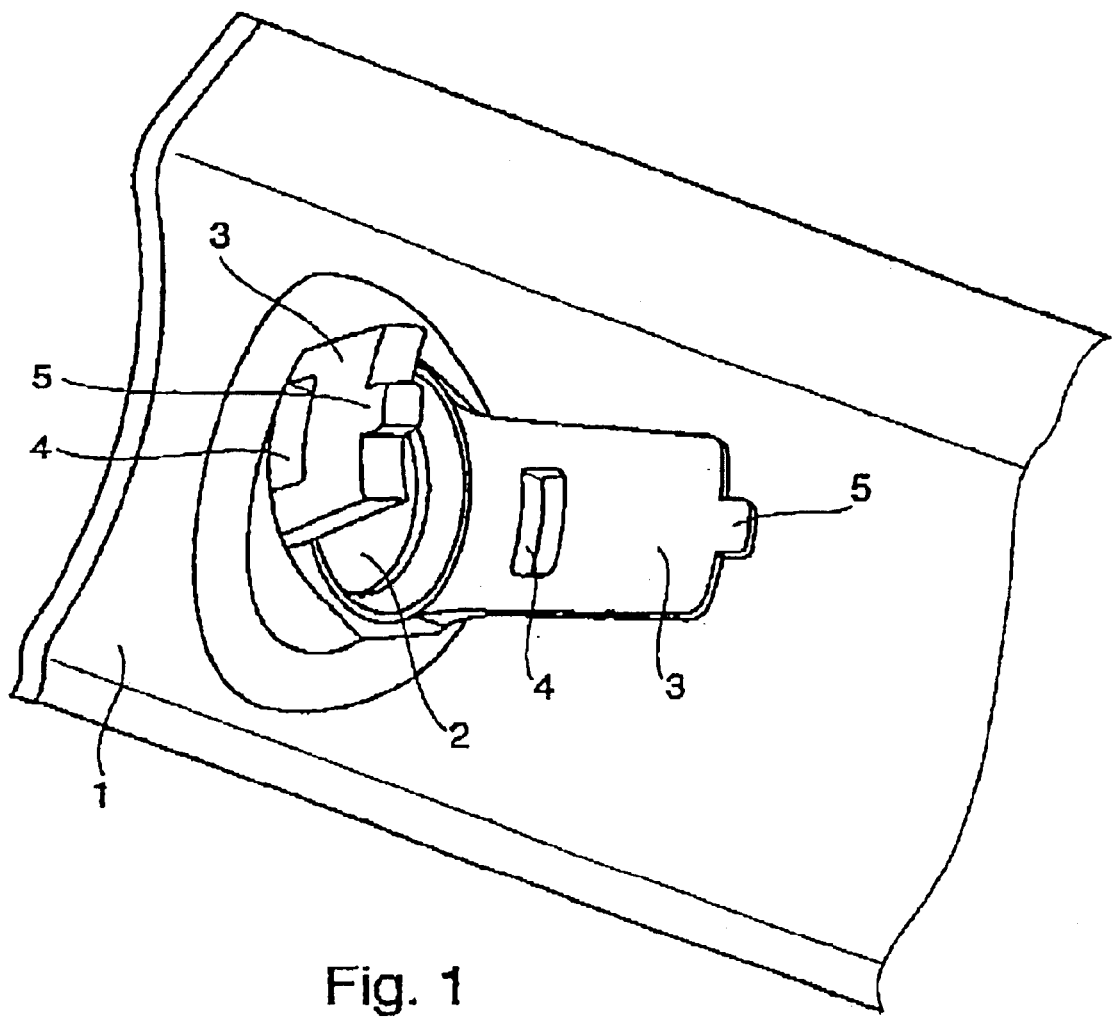
FIG. 1 is a top plan view of the interior of an external part of a motor vehicle's bumper having a receiver provided with arms which is formed on it.

An outer portion consisting of plastic, of a bumper of a motor vehicle, serves in this embodiment as the attachment 1. The plastic is not materially appropriate for use in making it into a resiliently deformable snap fastening element. The fastening device is situated on the attachment 1 at an opening 2 into which a parking sensor, not shown, can be inserted as the part to be fastened.

On the inner surface of the bumper facing away from the seen side of the attachment 1 serving as a bumper, a receiver is formed around the opening 2 in a surface area running approximately concavely on all sides. This receiver consists of two diametrically opposite arms 3. Each of these arms 3 runs on the peripheral surface of a cone entering the opening 2, the cone diameter diminishing toward the opening. In relation to the plane of the opening 2, the arms 3 thus are at an obtuse angle as seen from this opening.

At the base of each of the two arms 3 an opening 4 is provided which is in the shape of an oblong rectangle. At their free ends the arms 3 have, in the center of their circumference, sections 5 projecting outwardly finger-like in the lengthwise direction.

Figure 2:
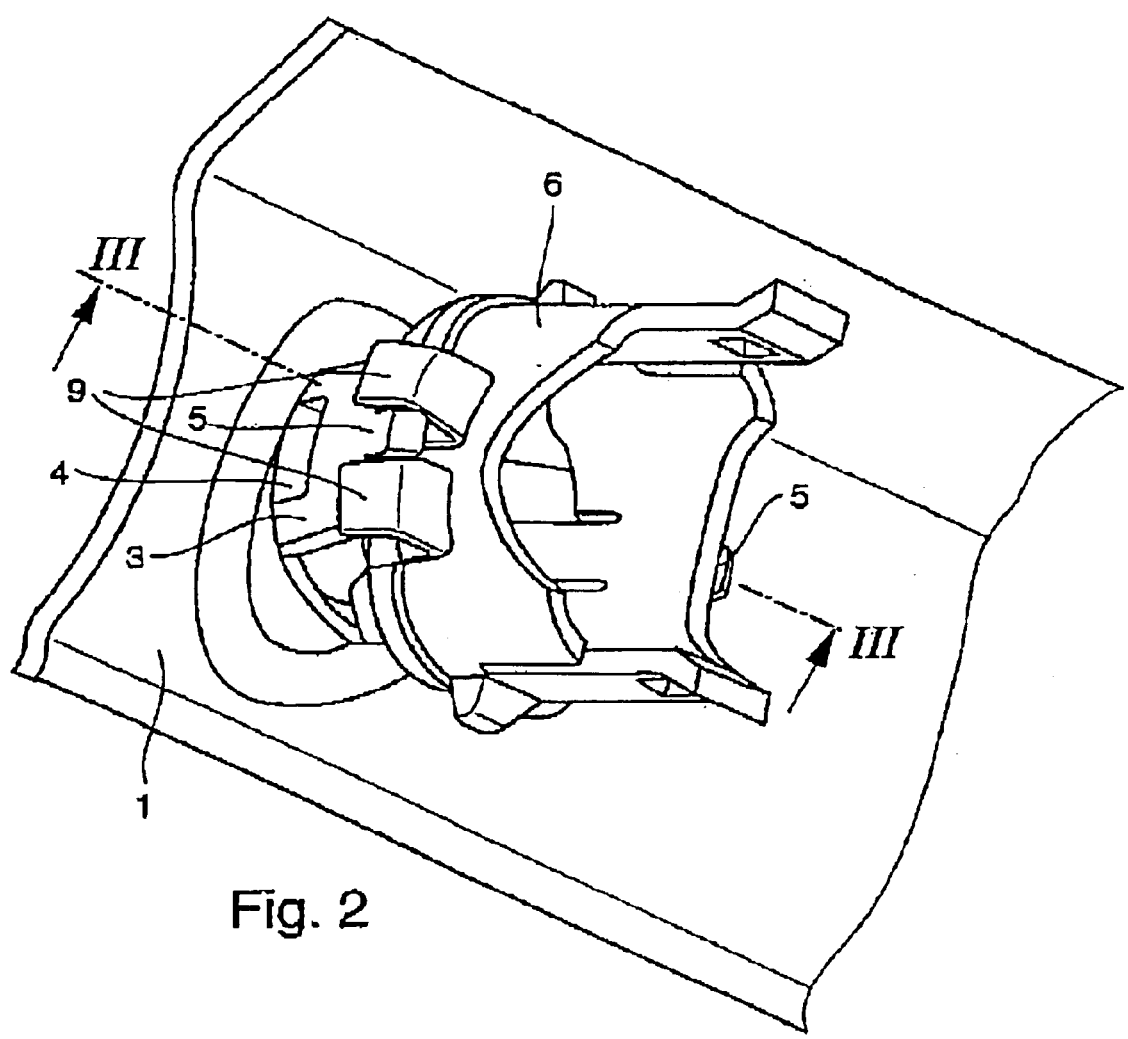
FIG. 2 shows the attachment with the receiver of FIG. 1, having a plug-in element inserted into this receiver and held in position on all sides by a snap fastening means.
Figure 3:
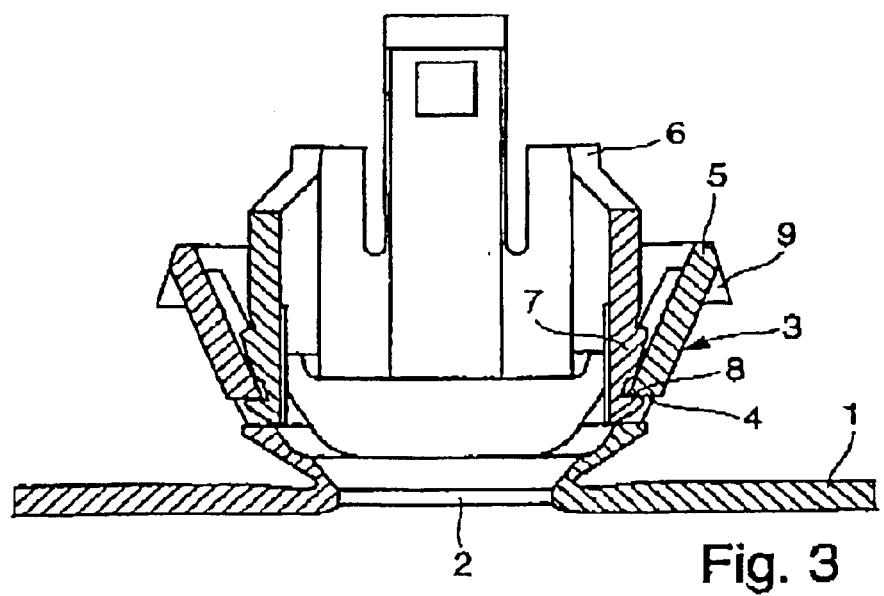
FIG. 3 is a section taken through the device of FIG. 2 along the section line III—III appearing in FIG. 1.

As represented in FIG. 2, a plug-in element 6 is held by a snap fastening between the arms 3. The snap fastening is produced by means of two tongues 7 provided on the plug-in element 6, which spring radially outwardly, and enter by flexing outwardly into the openings 4 with the radially projecting catches 8 provided on their extremities. The snap-on element 6 holds the parking sensor which is a part to be mounted also through a snap fastening.

In order to assure a connection between the arms 3 and the plug-in element 6 that will be stable on all sides, pockets 9 are provided on the plug-in element, which engage the free ends of the arms with their areas laterally adjacent to the finger-like section 5 in a position-fixing manner on all sides. These pockets 9 are formed in each case by a pair of L-shaped corners formed on the plug-in element 6. By means of the middle sections 5 on the arms 3 a fixation is created circumferentially between the plug-in element 6 and the arms 3. The axial fixation between the plug-in element 6 and the arms of the socket is achieved at one axial end by the barbs 8 on the tongues 7 of the plug-in element 6 and an associated contact surface as well as at the other end within the pockets 9.

As shown in FIG. 2, the arms 3 project lengthwise of the attachment 1 serving as the exterior side of a bumper. The circumferential free spaces between the two arms 3 extend, however, in the transverse direction. The arrangement and configuration of the receiver surrounding the opening 2, with the two arms 3 separated circumferentially from one another, is excellently suitable for the production of the exterior area of the bumper consisting of plastic by means of easily divisible molding tools.

What is claimed is:

1. Fastening device on a plastic attachment for a motor vehicle, comprising a socket formed integrally on the attachment for a part to be fastened to the attaching means of a snap fastening, the part, like the attachment, having no resiliently deformable snap fastening element, and with a plug-in element with resiliently deformable snap fastening elements for position-fixing snap fastening to the part to be fastened, on the one hand, and to the receiver on the attachment, on the other hand, the plug-in element being made for insertion into the receiver, wherein:

a) the receiver of the attachment has for the engagement of at least one of the snap-fastening means of the plug-in element substantially oppositely lying, circumferentially defined arms with at least one opening each with respect to the direction of insertion of the plug-in element to achieve the snap fastening in question, b) the plug-in element is provided with pockets for the engagement of the arms of the receiver of the attachment in which the arms are held in position on all sides with freely terminating end areas in a plane perpendicular to the direction of insertion of the plug-in element.

2. The fastening device according to claim 1, wherein the plug-in element is fixed axially in the receiver of the attachment by application of the arms of the plug-in element and of the snap-fastening means, in the form of tongues, of the plug-in element to the undercuts in the arms which are in the form of openings.

* * * * *